United States Patent [19]

Eickmann

[11] Patent Number: 5,109,666
[45] Date of Patent: May 5, 1992

[54] SOLID FUEL COMBUSTION DEVICE AND A COMPRESSOR

[76] Inventor: Karl Eickmann, 2420 Isshiki, Hayama-machi, Kanagawa-ken, Japan

[21] Appl. No.: 313,673

[22] Filed: Feb. 22, 1989

Related U.S. Application Data

[63] Continuation-in-part of Ser. No. 87,845, Aug. 19, 1987, Pat. No. 4,809,503, which is a continuation-in-part of Ser. No. 799,663, Nov. 14, 1985, abandoned, which is a continuation-in-part of Ser. No. 531,512, Sep. 12, 1983, abandoned, and a continuation-in-part of Ser. No. 64,248, Aug. 6, 1979, abandoned.

[51] Int. Cl.$^5$ ............................................. F02C 3/26
[52] U.S. Cl. .................................... 60/39.464; 60/39.6
[58] Field of Search .................. 60/39.464, 39.47, 252, 60/253, 254, 255, 256, 39.6

[56] References Cited

U.S. PATENT DOCUMENTS 1,580,656  4/1926  De Coninck ..................... 60/39.464
3,092,959  6/1963  Scurlock et al. ..................... 60/252
3,980,064  9/1926  Ariga et al. ..................... 123/203
4,300,482  11/1981  Tinkham ..................... 60/39.464

Primary Examiner—Louis J. Casaregola

[57] ABSTRACT

A solid fuel preferred to be prepared from cleaned and pressed coal powder to a high density is led into a combustion chamber. Air is compressed to a high temperature which exceeds the self ignition temperature of the mentioned solid fuel. This compressed air is also led into the combustion chamber to meet there the tip of the solid fuel sheet and to ignite and burn the fuel in the hot air in the combustion chamber. The hot burned gas can then be led into an expander and the expander can drive a compressor for the supply of the mentioned hot air. The device then forms a combustion engine with continuous combustion in an external combustion chamber. In my parental U.S. Pat. No. 4,809,503 the solid fule is a fuel bar. This present application deals mainly with a solid fuel sheet or tape which is wider than it is thick. Thereby it is secured that the fuel portions meet exactly the required amounts of hot air locally at a wide meeting and burning place.

1 Claim, 2 Drawing Sheets

SOLID FUEL COMBUSTION DEVICE AND A COMPRESSOR

REFERENCE TO RELATED APPLICATIONS

This is a continuation in part application of my application Ser. No. 07/087,845, now U.S. Pat. No. 4,809,503, issued on Mar. 7, 1989. Application Ser. No. 07/087,845 was filed on Aug. 19, 1987 as a continuation in part of Ser. No. 06/799,663, now abandoned, filed on Nov. 14, 1985 as continuation in part of Ser. No. 06/531,512, filed on Sept. 12, 1983, now abandoned, and filed as a continuation in part of Ser. No. 06/064,248, now abandoned, and filed on Aug. 6, 1979.

BACKGROUND OF THE INVENTION

1. Field of the Invention

The invention is concerned with combustion engines, wherein a compressor supplied compressed air to a combustion chamber, fuel is burned in the hot air in the combustion chamber and an expander is driven by the hot gases, which in turn drives the compressor. More specifically, the invention deals with the creation of a burning place and accessories thereto, wherein a solid fuel tape burns in the compressed air in the combustion chamber.

2. Description of the Prior Art

Around the turn of the century many inventions were made for burning coal powder in a separated combustion chamber between a compressor and an expander. Such patents are for example: U.S. Pat. Nos. 708,236 to Leonhard, 869,781 to Holden and other patents of the time around the year of 1900.

Success in the economy of those engines was, however, rarely reported. However, a very intensive research, development and building and application of coal-powder fuel run Diesel engines has developed during the first 40 years of our century. The leader in this field was Mr. Pablikowski, who obtained many patents and issued many articles in magazines in English, French and German languages.

A very extensive report was given about these happenings by Soehngen and associates by order of the Energy department under title: "Development of coal burning Diesel engines in Germany" during August 1966, (Energy Research and Development Administration) and this very important report can be obtained from: National Technical Information Service, U.S. Department of Commerce, Springfield, Va., 22 161.

There have been some attempts in the former art to burn slurry or cakes from coal powder. For example, the Tinkham U.S. Pat. No. 4,300,482 discloses a carburator in which particles of fuel are abrased from a fuel cake or semi solid fuel.

The U.S. Pat. No. 1,580,656 of De Conninck discloses a supply of powdered semi fluid fuel over a passage into the burning chamber of a permanent combustion engine.

These proposals have several problems, since they fail to use a rigid solid fuel bar at a specified running speed towards the burning chamber in relation to the rate of flow of compressed air into the burning— or combustion—chamber.

Specifically the abrasion of particles from a fuel cake as done by Tinkham can not control the details of abrasion locally and can not secure the direction and speed of flow of the abrased particles of fuel.

Similarly, the drying of semi fluid powdered fuel in the De Conninck patent close to the burning place does not compress the powder from the slurry into a rigid bar but leaves a column of powder which can spray away in several or in many directions under the influences of pressures and velocities in the combustion chamber.

Thereby both mentioned patents fail to be able to control the local particles of fuel after they have entered into the combustion chamber. Precise and uniform burning of fuel in fluid can, consequently, not be obtained by these patents. Further, the cake and the semi fluid fuel of the mentioned patents require big storing spaces because the cake and the semi fluid is a mixture of solid fuel which has a high specific weight with a fluid, like liquid or air, which has a low specific weight. The overall specific weight of the mentioned fuels is thereby too low compared to the desired rigid solid fuel bar fuel of the present invention.

SUMMARY OF THE INVENTION

The aim and object of the invention is, to overcome problems of the engines of the prior art and to provide a reliable engine for the burning of solid fuel bars in a combustion chamber.

In the coal powder burning Diesel engines the problem occurred, that the injection of the coal dust never reached a good perfection. The mixture of coal powder and air was never uniform in the cylinder of the Diesel engine. Consequently, the combustion was uncomplete and unburned coal powder particles run into the clearance between piston and cylinder, whereby the cylinder wear became high and the exhaust gases contained poisonous matter which polluted the environment.

Therefore, the present invention aims to provide an engine, wherein a fuel sheet moves into a burning place at which the fuel sheet enters incoming compressed hot air. The air is compressed in such a high ratio, that the temperature of the compressed air is higher than the ignition temperature of the fuel sheet. The tip of the fuel sheet then ignites and burns in the compressed air.

One object of the invention, therefore, is to provide a burning place for a solid fuel sheet in hot air.

Another object of the invention is to provide an automatic and continous supply of hot compressed air to the burning place in combination with the permanent advance of the tip of the solid fuel sheet into the burning place for the continuing and permanent combustion of the fuel sheet in the compressed hot air.

A still further object of the invention is to align the speeds and dimensions of the incoming compressed air, the burning place and the solid fuel sheet in order to obtain an almost complete combustion during burning of the fuel in the compressed air, while more objects and aims of the invention may become apparent from the study of the description of the preferred embodiments and the figures.

DESCRIPTION OF THE PREFERRED EMBODIMENTS

Figure 1:
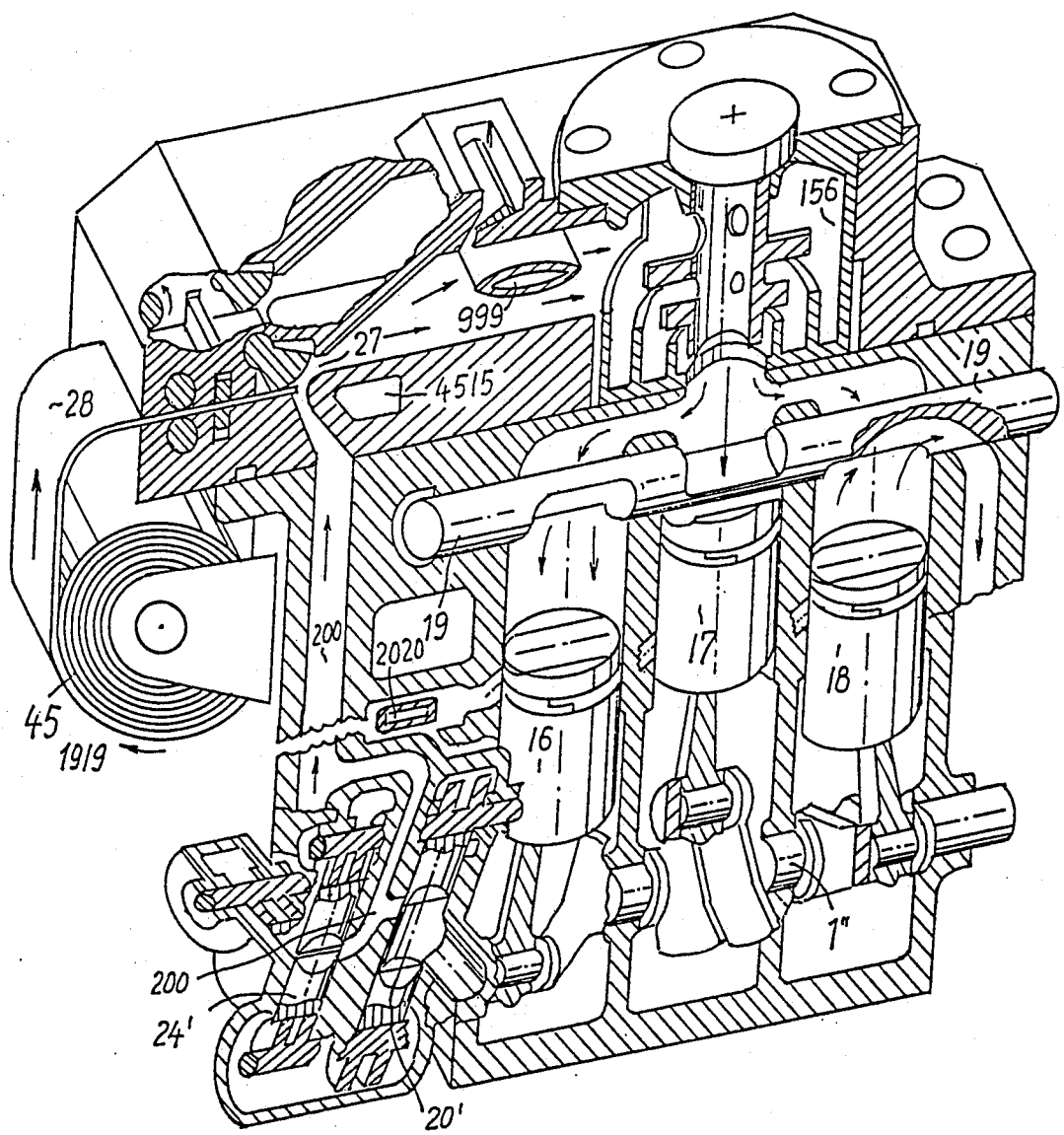
FIGS. 1 and 2 show longitudinal sectional arrangements through an embodiment of a combustion engine of the invention, wherein valves and pistons are partially illustrated in spherical views onto them.
Figure 2:
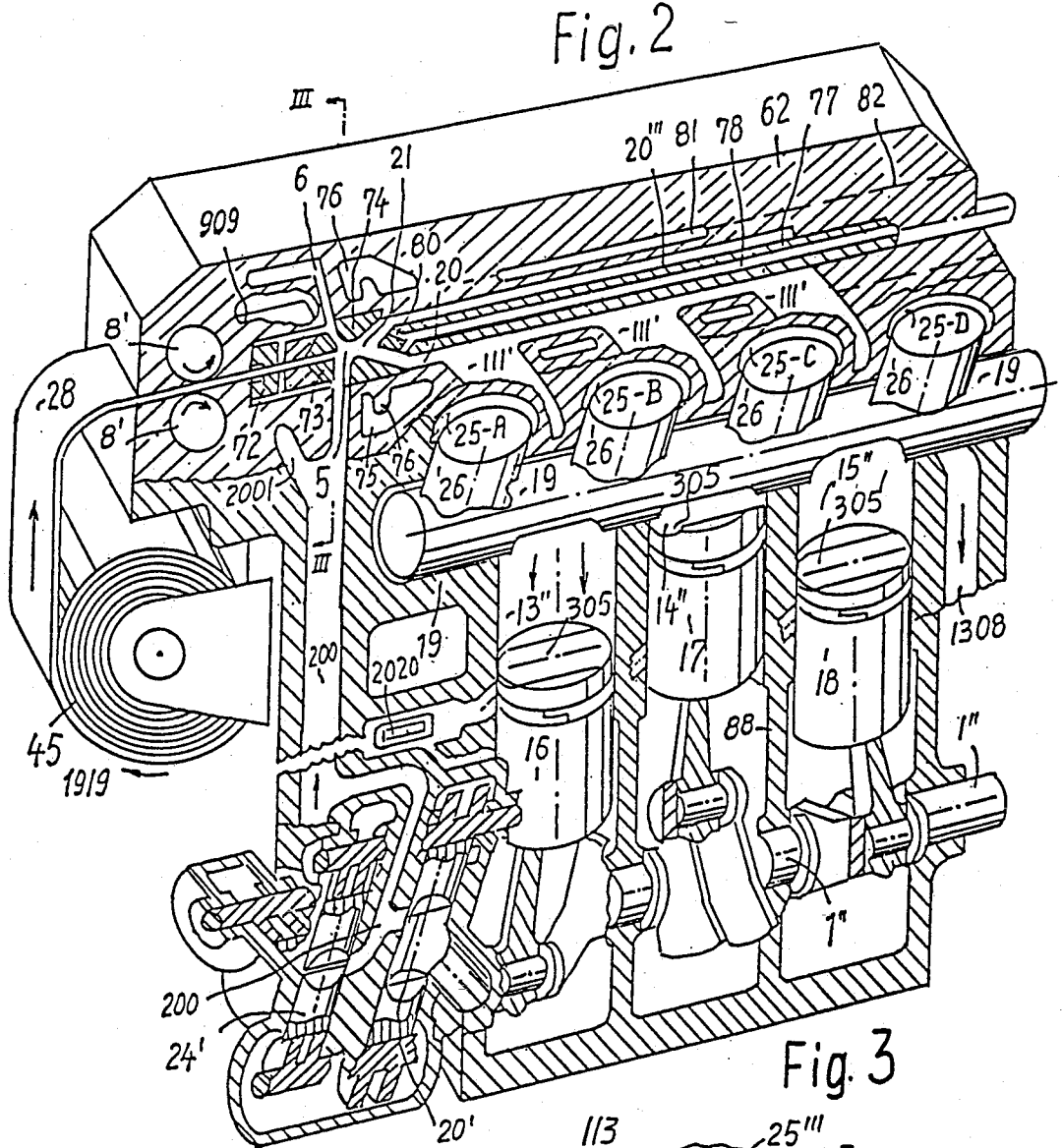

In FIGS. 1 and 2 the fuel which burns in the combustion chamber of the respective engine is a coal-tape. It consists of coal-powder wherein the powder is held together by a small amount of burnable glue. The main content of the sheet is, however, powdered natural coal. While it is convenient to press a plane sheet of coal powder with a respective amount of binding glue, it is less convenient to store plane sheets in cars or electric power plants. It is also more convenient at production to produce a thin, bute wide, sheet of coal powder by a continuously running procedure. Then rollers and supply nozzles can be used for a continuous production. The adding of a small amount of burnable binding glue is then also controllable in a continuing production process. If the sheet is produced thin enought, then it can become rolled to tape on a roll. Thickness of the sheet and the modulus of elasticity of the coal-powder-binder define the smallest radius for bending the sheet around a roll to the form of a rolled tape.

FIG. 1 is basically a combustion engine of the invention.

In this Figure, the engine's interior is seen in a spherical view into it. And there are novelties in this Figure, especially the use of a tape as fuel. Crank shaft 1' is connected by con rods to pistons 16, 17, 18 which reciprocate in cylinders. Crank shaft 1' drives the compressor means 20, 24 to deliver highly compressed air through passages 200 and 0200 to the already known burning place, where the fuel tape 28 moves into the hot arriving compressed air. This burning place, where the tip of the fuel tape ignites and burns in the hot and compressed air is shown by referential 5. Seals and tape advancement arrangements are provided. The fuel tape is rolled to a roll 45 wherefrom the fuel tape is taken. The sectional view with the arrows therein makes it clearly visible, that the fuel tape which may be cleaned and compressed coal, is very thin but very wide. After the burning of the fuel in the burning place or in the combustion chamber, the gas may flow through a cleaning arrangement with dirt collection chambers. The gas flows then over the the control valve 19 into the respective cylinders to drive the respective pistons 16 to 18 therein, one after the other. Demonstrated in this Figure is also, that the cylinders are flashed in the substantially one directional flash flow for two-cycle operation in order to obtain a high power per unit of weight. The gas flow flows out of the outlet passages on the bottoms of the cylinders, which have indicating flow directional arrows and may flow into chamber or around chamber 1919 to heat therein in space 2020 water for example into almost saturation point if so desired. Walls 1919 may be built strong in order to permit the heating of water under high pressure if so desired. Water or steam may further be heated in the chamber 999 which extends into or is located inside of the combustion chamber. Therefrom the water or steam may be led through the wide but thin nozzle above the chamber 999.

More details will become apparent from the discussion of later Figures.

FIG. 2 demonstrates an engine which is similar to that of FIG. 1. However, in this Figure the valve 19 is better visibly illustrated in a spherical view and the thrust bodies 26 in thrust chambers 25 are more clearly visible here to show to the eye, how the valve 19 is pressed into sealing engagement on the valve bearing bed of the engine. The functioning of these matters were already described at the description of the Figures for rotating or pivotable valves in this patent application. The Figure further demonstrates more visbly, where the local hot places of the engine are and where it is suitable to place portions of non burnable and nonpmeltable material. For example, portions of ceramic material. Consequently, the burning place 5 is according to this Figure provided in its neighborhood with particles or inserts 73, 74 of heat resistant materials. Additionally these portions are subjected to ribs 75 in cooling chambers 76 for effective cooling of the hot portions or members 73 and 74. Members 73 are adjacent to the advancing fuel tape tip. Members 74 border the flame place or burning place 5. Also clearly visible illustrated in this Figure is the water or steam supply or injection passage 78 with inlet nozzle(s) 80 to mix in place 21 the hot gases from the burning place 5 with water or steam to transfer the mixture of hot, but now cooled gas and heated steam along the passage 111'. A cooling or heating chamber 81 may be provided in engine head 62 either for cooling or for heating up of water or steam therein. This assembly with passage 78 and-or space 81 may be an insertable portion which may be moved along the dotted line 82 into the engine head 62. The passages 20, 111' from the combustion chamber to the valve 19 are also clearly shown. Of special interest is further, that the piston heads of pistons 16 to 18 have the complementary radii configuration of part-cylindrical piston head portions respective to the outer face of the outer diameter of the cylindrical or bar valve 19. This complementary configurations of portions of the piston heads and their importance was already described at the description of earlier Figures.

The probability to inject or supply water, heated water or steam into the engine of the Figures will become understood at head of the later follwing analysis of the present patent application. Gradually, however, at the description of the Figures, means have been described which are consequences of the result of the later following analysis.

Figure 3:
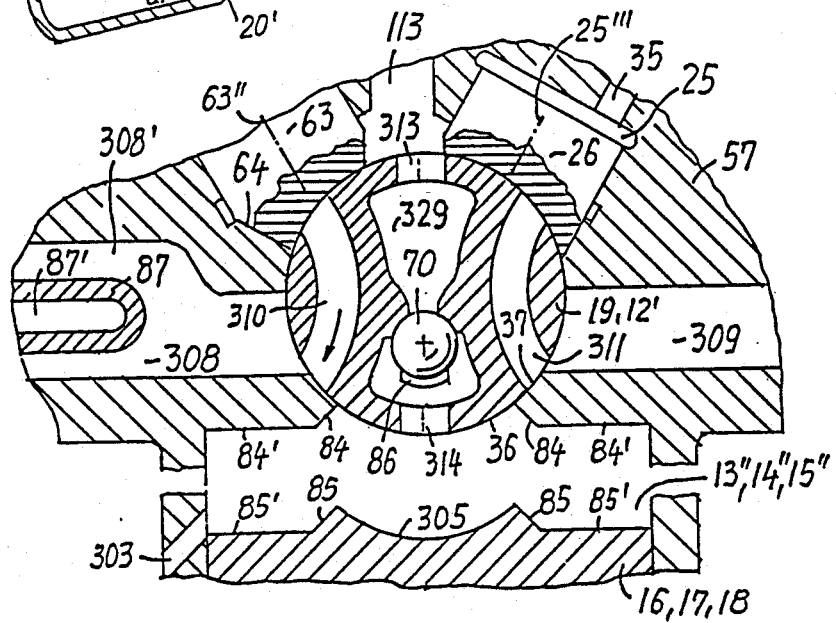
FIG. 3 is a cross sectional view through a rotary—or pivoting-valve, which is applyable in FIGS. 1 or 2.

FIG. 3 is a cross sectional view through the valve head or cylinder head portion of the respective engine of the respective Figure, which contains the pivotable or rotatable control valve for the flow of fluid.

Valve head 57 has the bearing bed 37 for bearing thereon the cylindrical outer face 36 of valve 19. Valve head or cylinder head 57 has the passages 308, 309 thrust chamber 25 with passage 35, axis 25''' and thrust body 26, flashing passage 113, thrust body 63 with axis 63''' and bearing face 64 and may have a cooling space 87' in member 87 for example in passage 308, 308'. Valve 19 is pivotably or rotatably borne on the bearing bed 37 in the cylinder head or valve head 57. Valve 19 has the control passages 310 and 311 which alternatingly communicate the cylinder or working chamber 13-15 with passage 308 and 309. Valve 19 has additionally the medial flash through passage 314 with ports 313 and 314 and with the one way check valve 70 therein. Valve ball or body 70 is slightly held in its seat by the flat or plate spring 86. FIG. 3 is supplied to show the flash through passage 113, 313, 314 more clearly and to more clearly see the valve 70 with spring 86 therein. This Figure is further provided to demonstrate the very important configuration of the piston head. Seen here are the laterally outer flat and plane face portions 84' of the cylinder head, whereon medially the inclined and plane face portions 84 follow to end on the bearing bed face of bearing bed 37. Between the inclined face portions 84 the cylinder chamber 13"-15" is closed by the outer face 36 of the valve 19. This cylindrical outer face 36 is interrupted by the passages 310, 311, 313 and 314 to either flash the cylinder 13"-15", to close the cylinder 13-15 by the one way valve 70 or to communicate cylinder or working chamber 13-15 with passage 310, 311 to the combustion chamber or another chamber or to communicate the chamber 13-15 with passage 309 and thereby with the exhaust, a compressor or another space. The important matter of the invention is in this embodiment, that the piston 16-18 forms a top face with the laterally outer plane faces 85' complementary to the plane face portions 84' of the cylinder head, while on the innermost ends of these plane face portions 85' the inclined face portions 85, which are also plane, but would be tapered, if the face portion 84 are tapered (coned) are provided to be complementary to the inclined faces 84 of the cylinder head. The medial face portion of the top face of piston 16-18 extends between the innermost ends of the inclined face portions 85 and is the hollow part cylindrical medial face portion 305 to be complementary to the respective portion of the outer face 36 of the valve 19. When the piston is in the top position, the faces 85', 85, 305 of the piston will be very close to or meet the respective face portions 84', 84, 36 to reduce or eliminate dead space in the cylinders or working chambers 13 to 15.

The Figure shows the embodiment ready for the flashing of the working chamber 13-15 with fresh air or pre compressed air or for pivotal or rotary action to exhaust the gas or air out of the cylinder. In the Figure the piston 16-18 is shown near to its bottom position, whereby the outlet slots 303 are opened by the pistons 16-18. If now gas or air is pressed or supercharged to passage 113 the fluid will flow through passage 313 into chamber 329 to press against the valve 70 and to open the valve 70 downwards away from its seat. The fluid will then flow on through valve 19's passage 314 and through working chamber 13-15 for example, to clean it from exhaust gases which then will flow out through the exhaust passage (es) 303. When moving upwards, piston 16-18 will close the exhaust passage(s) 303 and compress the now fresh fluid, for example, super charged air or air in the working chamber 13 to 15.

What is claimed is:

1. A combustion chamber, comprising, in combination, a housing portion which forms said chamber, separate supply passages for the supply of hot air and fuel to a burning place in said chamber and a delivery passage for the transfer of the burned gas(es) out of said combustion chamber, wherein said fuel supply passage is a thin, but wide, nozzle with said width exceeding the hight at least three times, and, wherein said supply passage for said hot air is also a thin, and relative to its thin-ness, wide nozzle, located close to, parallel to and at least partially adjacent and before said fuel supply passage with the width of said air supply passage being substantially equal to the width of said fuel supply passage, and, wherein said fuel is a thin, but wide tape, made from cleaned and powdered coal.

* * * * *